Aug. 14, 1923.
A. E. C. GILMOUR
SHOCK ABSORBER
Filed Sept. 15, 1921
1,464,524
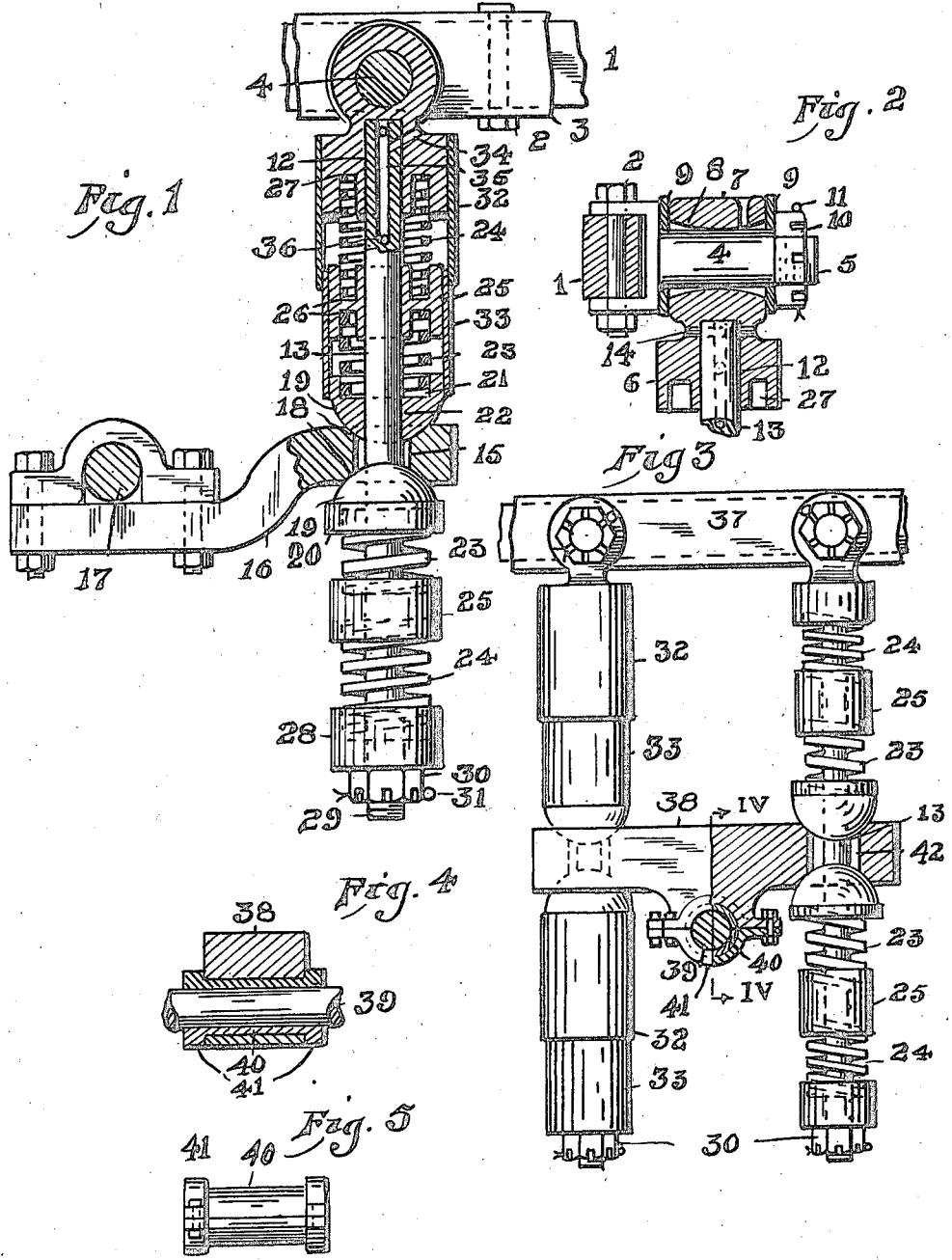

Patented Aug. 14, 1923.

1,464,524

UNITED STATES PATENT OFFICE.

ALFRED E. C. GILMOUR, OF WILKINSBURG, PENNSYLVANIA.

SHOCK ABSORBER.

Application filed September 15, 1921. Serial No. 500,921.

*To all whom it may concern:*

Be it known that I, ALFRED E. C. GILMOUR, a citizen of the United States, residing at Wilkinsburg, in the county of Allegheny and State of Pennsylvania, have invented certain new and useful Improvements in Shock Absorbers, of which the following is a specification.

This invention pertains to shock absorbers for neutralizing or minimizing the effects of shocks or jars to motor vehicles, and resist the throw of the vehicle body under the influence of road inequalities.

Objects of the present invention are to provide a device of the class stated which will operate efficiently to resist abnormal throw of the vehicle body under adverse road conditions, without liability of breaking the springs or racking the vehicle, and which permits of the variable movements of the vehicle body without cramping or binding the working parts of the absorbing mechanism.

Other objects are to provide an absorber of the character described, which not only prevents shocks due to rough roads, but produces a steadying effect when the vehicle is travelling upon ordinary roads or paved streets, eliminating the minor jolts and preventing the cumulative effect of successive small bumps by controlling all movements of the vehicle body to and from the chassis; and whereby a desired maximum cushioning effect is obtained and undue depressions and rebounds are effectively checked, with little or none of the objectionable sudden shocks frequently concomitant in the use of shock absorbing mechanisms now in general use.

Further objects of the invention are to provide a device for the purpose set forth which is comparatively simple in its construction and arrangement, strong, durable and efficient in its use, convenient to install, adjustable, positive in its action, attractive in appearance, and inexpensive to manufacture.

With other objects in view, that will appear in the following description, my present invention is a shock absorber that embodies the peculiar features of construction and novel arrangement of parts hereinafter explained in detail, specifically pointed out in the appended claims and illustrated in the accompanying drawing, which forms a portion of this specification and wherein like numerals of reference designate corresponding parts throughout the several views, and in which:

Figure 1 is a side elevation of a shock absorber in accordance with this invention, with portions thereof shown in section.

Figure 2 is a detail sectional view of the socket member and associated parts.

Figure 3 is a side elevation illustrating the application of the device in pairs.

Figure 4 is a sectional view on line IV—IV, Figure 3.

Figure 5 is a horizontal view of the bushing member.

Referring in detail to the drawing 1 designates the usual structural steel frame upon which the vehicle body (not shown) is adapted to be mounted. Fixedly secured to the frame 1, by means of bolts 2, is a channel bar 3, integrally formed with an inwardly extending stud bolt 4 having a threaded inner end 5 and disposed at right angles with respect to the bar 3.

Pivotally mounted on the stud bolt 4 is a socket member 6 including a head 7 provided with a transverse bore 8, through which the stud bolt 4 extends. The diameter of the bore 8 gradually increases from the center to the ends thereof, as is clearly shown in Figure 2 of the drawing, for the purpose of permitting a slight oscillatory lateral movement of the socket member and associated parts, and at the same time providing an anti-friction pivotal connection therefor. A washer 9 is positioned on the stud bolt 4 at each end of the head 7, and the socket member is secured in position by the slotted nut 10 and the cotter 11 on the threaded end 5 of the bolt 4.

The lower portion of the socket member 6 is formed with a socket 12 in which a vertically extending stem or carrier 13 is fixedly mounted by means of the rivet 14. The carrier 13 extends through an aperture 15 formed in the buffer plate 16 in such manner that approximately one-half thereof projects below the buffer plate 16. The buffer plate is rigidly secured to the vehicle axle 17 in any suitable manner. The aperture 15 is considerably larger than the diameter of the carrier 13, passing therethrough, for the purpose hereinafter fully explained.

The upper and lower faces of the buffer plate 16, surrounding the aperture 15, are each formed with a recessed seat 18, in which a pair of opposed rocker members 19 are seated. The opposed ends of each of the rocker members 19 is rounded and engages respective seat 18, while the other end thereof is provided with a peripheral vertical flange 20 forming the pocket 21. The rocker members 19 are each provided with a central bore 22 and is slidably mounted on the carrier 13.

A heavy spiral spring 23 and a comparatively light spiral spring 24 are mounted on that portion of the carrier 13 extending above the buffer plate 16 and on that portion of the carrier projecting below the buffer plate.

A coupler 25, slidably mounted on the carrier 13, is interposed between each pair of springs 23 and 24. A deep annular groove 26 is formed in the upper and lower face of the coupler 25 providing seats for respective ends of the springs. One end of the heavy spring 23 is seated in the pocket 21 of the rocker member 19, while the other end thereof is seated in an annular groove 26 of the coupler 25. The lower portion of the socket member 6 is also formed with an annular groove 27 for the reception of the upper end of the light spring 24 mounted on that portion of the carrier 13 extending above the buffer plate 16. The lower portion of this spring 24 is seated in the groove 26 of the coupler 25.

The light spring 24, mounted on that portion of the carrier extending below the buffer plate 16, has the upper end thereof seated in the groove 26 of a coupler 25, while the lower end is seated in the cup member 28, which latter is slidably mounted on the lower end of the carrier 13.

The lower end of the carrier 13 is threaded, as at 29, and is engaged by a slotted tensioning nut 30 which is held in the adjusted position by the cotter 31.

The two pairs of springs 23 and 24, when in the normal position, are sufficiently tensioned by the adjustment of the nut 30, to hold the rocker members 19 in their respective seats in the buffer plate 16 regardless of the vertical movement of the carrier 13 during the operation of the device in practice.

Each of the pair of springs 23 and 24 is fully enclosed in a suitable casing consisting of two telescoping sections 32 and 33, the former overlapping the latter. The casing section 32 enclosing the upper pair of springs is attached to the socket member 6 and the section 33 to a rocker member 19. The casing section 32 enclosing the lower pair of springs is carried by the other of the rocker members 19, while the section 33 is secured to the cup member 28. The casing not only prevents the entrance of any extraneous matter which might interfere with the proper functioning of the device, but constitutes a chamber for packing the absorbing elements in grease if so desired.

For lubricating purposes, an oil hole 34 is provided in the socket member 6, which communicates with the vertical conduit 35 formed in the upper portion of the carrier 13 and having an opening 36 on the periphery of the carrier.

Figure 3 of the drawing illustrates the application of the device in multiple, showing two units connected to a common suspension bar 37. The buffer plate 38, provided with enlarged apertures 42, is so arranged on the axle 39 as to position one unit forward of the axle and the other at the rear thereof. The buffer plate 38 is mounted on the bushing 40 to permit rocking movement of the plate 38 thereon. The bushing 40 is fixed to the axle 39 and provided at each end with an annular flange 41 to prevent lateral movement of the plate 38. While the two units of the device will normally operate synchronously, the rocking of the plate 38 will augment the compensatory action provided to eliminate cramping or binding of the working parts of the mechanism.

In operation the normal shocks and jars from depression or rebound of the vehicle body will be absorbed by the operation of the light springs 24 only. In the case of abnormal shocks, however, the heavy springs 23 will take over the absorption load while springs 24 are compressed to a point where the lower face of the socket member 6 and the upper face of the coupler 25 abut against each other in the upper portion of the device, or in case of recoil, until the lower face of the other coupler 25 abuts against the upper face of the cup member 28.

The manner of suspending the socket member 6 from the bar 3, in conjunction with the freedom of movement allowed the carrier 13 in the enlarged aperture 15, and the action of the rocker members 19 in respective seats 18, will assure a limited universal movement to the absorbing mechanism, and provide for its efficient operation regardless of the vibration, sway, etc., of the vehicle.

From the foregoing description taken in connection with the accompanying drawing, the principle of construction and the method of operation will be readily apparent to those skilled in the art to which the invention appertains, and while describing what is now thought to be the best embodiment of the invention, it is to be understood that the device shown in the drawing is merely illustrative, and that various changes in the form, proportions, and minor details of construction may be resorted to, without departing from the principle, or sacrificing any advantages of the invention, which come within the scope of the claims hereunto appended.

What I claim is:

1. A shock absorber comprising a pair of rocker elements, a buffer plate interposed therebetween, a vertically movable carrier extending through said elements and through said buffer plate, a pair of springs of different tensions mounted on the carrier between each rocker element and an end of the carrier, one of said springs operating in advance of the other, means for shiftably connecting one end of the carrier with a vehicle body, and a telescopic casing enclosing each pair of springs.

2. A shock absorber for vehicles comprising a buffer element extended from the axle of the vehicle, a carrier extended from the body of the vehicle and projecting through said element connected by the latter with the vehicle axle, resilient elements mounted on the carrier above the buffer element, resilient elements mounted on the carrier below the buffer element, and a pair of oppositely disposed rocker elements mounted on the carrier and having direct contact with the opposite faces of the buffer element.

3. A shock absorber for vehicles comprising a buffer element extended from the axle of the vehicle, a carrier extended from the body of the vehicle and projecting through said element connected by the latter with the vehicle axle, resilient elements mounted on the carrier above the buffer element, resilient elements mounted on the carrier below the buffer element, and a pair of oppositely disposed rocker elements mounted on the carrier and having direct contact with the opposite faces of the buffer element, said buffer element having its upper and lower faces at its free end provided with semi-spherical seats, said seats being oppositely disposed, and each of said rocker elements being semi-spherical and directly engaging one of the seats.

In testimony whereof I affix my signature.

ALFRED E. C. GILMOUR.